Nov. 19, 1968     S. DIX     3,411,266
LOADING MACHINE
Filed Aug. 19, 1963     3 Sheets-Sheet 1
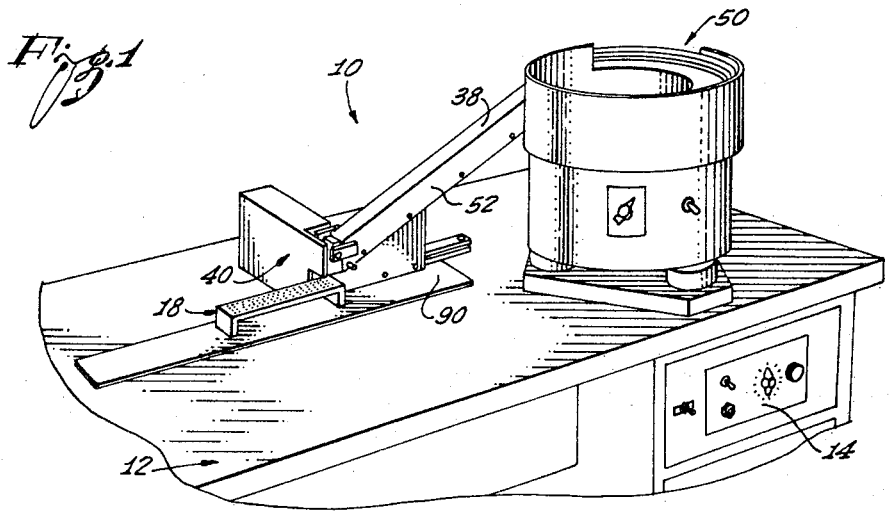
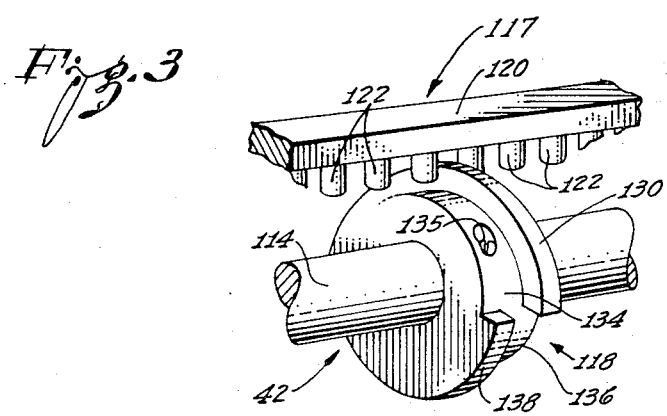
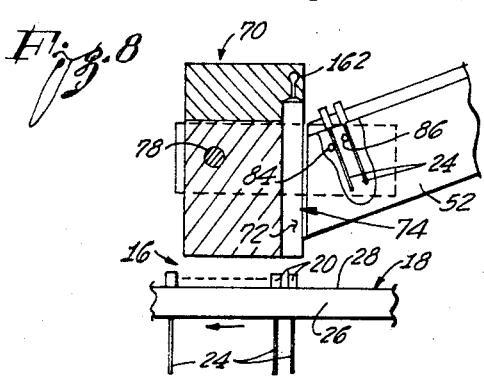
INVENTOR.
Sydney Dix
Attorneys

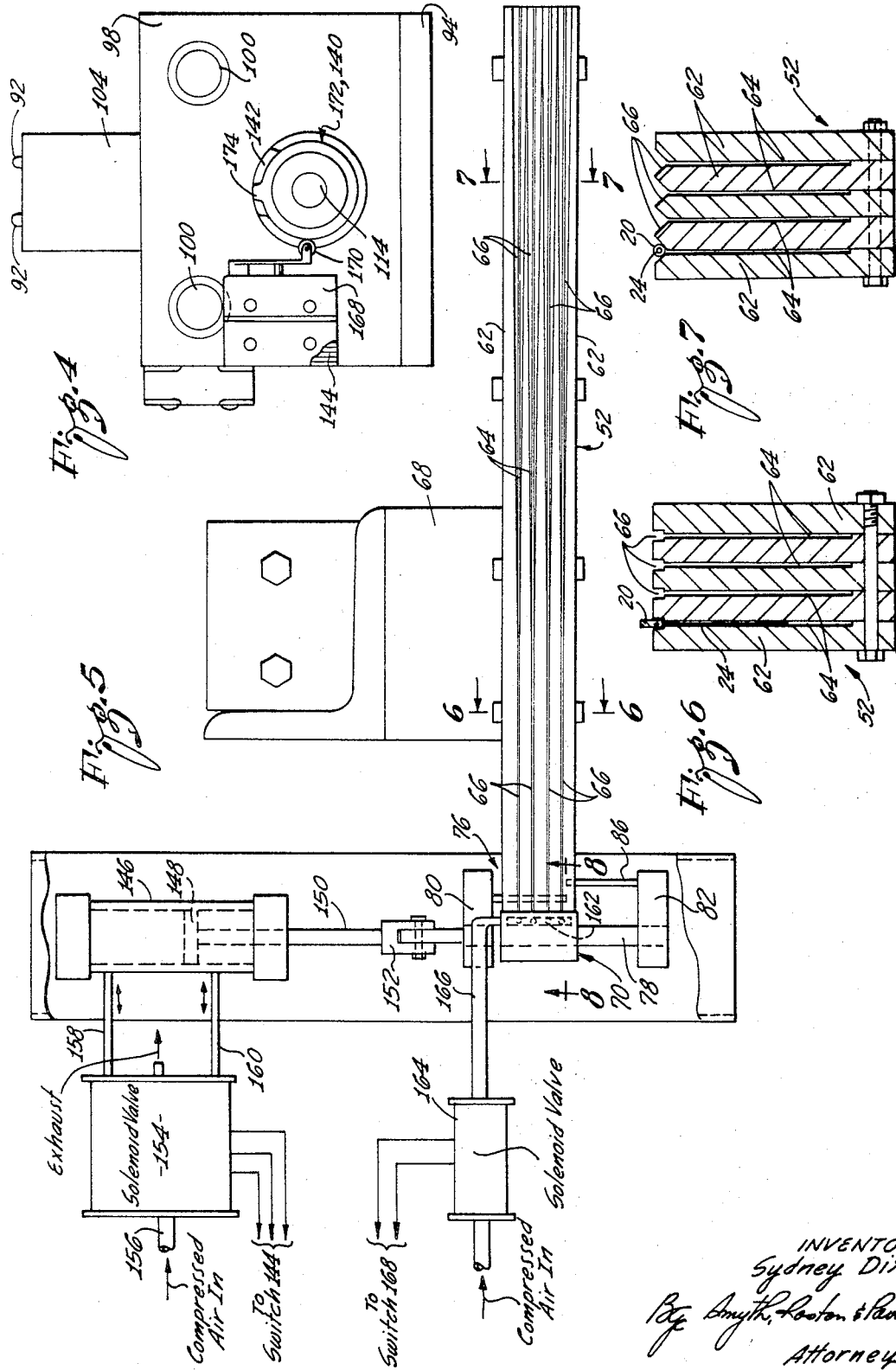

United States Patent Office 3,411,266
Patented Nov. 19, 1968

3,411,266
LOADING MACHINE
Sydney Dix, Costa Mesa, Calif., assignor, by mesne assignments, to GTI Corporation, Providence, R.I., a corporation of Rhode Island
Filed Aug. 19, 1963, Ser. No. 303,015
5 Claims. (Cl. 53—142)

The present invention relates to loading machines for loading a plurality of substantially identical workpieces onto workpiece holders and more particularly to drive means and control means for such loading machines.

At the present time there are a large number of industrial processes wherein an endless series of substantially identical workpieces are assembled into more comprehensive devices. In most of these processes it is desirable for groups of the workpieces to be loaded onto a workpiece holder so that the workpieces can be processed as a group rather than individually. For example, in the manufacture of some types of diodes, the diodes are encapsulated in a sealed glass envelope. In the process of assemblying the diodes, a large number of the empty glass capsules having only an electrical conductor sealed in their lower ends are loaded onto a holder or so called solder boat. This permits a large number of the capsules to be simultaneously handled as a group. Heretofore, it has been necessary for each of the glass capsules to be individually placed on the solder boat or holder one at a time by hand. As a consequence, the loading of the glass capsules onto the solder boats have been very slow and time consuming. This has not only severly limited the rate of production of the diode but has greatly increased the costs of such production because of the high cost of labor. In order to overcome these difficulties, it has been proposed to automate this loading operation by employing automatic loading machines. Although numerous attempts have been made to devise such a loading machine, the attempts have failed to produce any loading machines that are commercially acceptable. More particularly, no loading machines have been devised that are sufficiently reliable in operation and inexpensive to make them commercially feasible.

It is now proposed to provide an automatic loading machine which will overcome the foregoing difficulties. More particularly it is proposed to provide a loading machine that is capable of automatically loading workpieces such as glass capsules for encapsulated diodes onto a workpiece holder such as a solder boat at a high rate of speed and with a minimum amount of manual labor. In addition it is proposed to provide an automatic loading machine which is inexpensive to manufacture and to use and is simple and reliable in its operation.

These and other features and advantages of the present invention will become readily apparent from the following description of one operative embodiment of the present invention particularly when taken in connection with the accompanying drawings wherein like reference numerals refer to like parts, and wherein:

FIGURE 1 is a perspective view of a portion of an operative loading machine embodying one form of the present invention;

FIGURE 3 is a perspective view of a portion of a transfer mechanism employed in the loading machine;

FIGURE 4 is a cross sectional view taken substantially along plane 4—4 in FIGURE 2;

FIGURE 5 is a plan view of a portion of the loading machine;

FIGURE 6 is a transverse cross sectional view taken substantially along the line 6—6 in FIGURE 5;

FIGURE 7 is a cross sectional view similar to FIGURE 6 but taken substantially along the plane of line 7—7 in FIGURE 5; and FIGURE 8 is a fragmentary cross sectional view taken substantially along the plane of line 8—8 in FIGURE 5.

Figure 2:
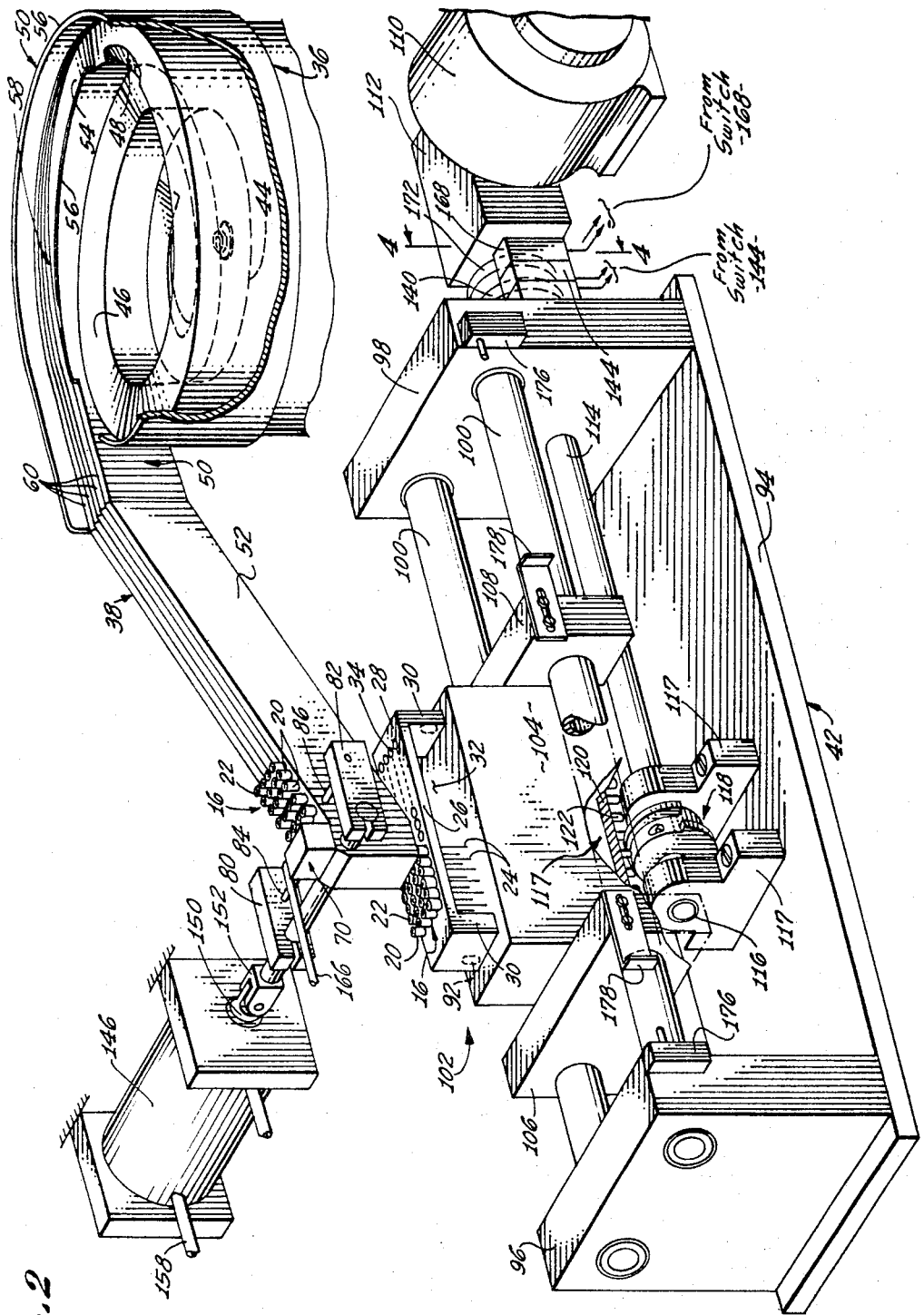
FIGURE 2 is a perspective view, on an enlarged scale, of a portion of the loading machine of FIGURE 1, portions thereof being broken away to more clearly show the details of some of the elements of the loading machine.

Referring to the drawings in more detail, the present invention is particularly adapted to be embodied in a machine 10 for loading workpieces onto a workpiece holder. The machine 10 may be mounted on any suitable support such as a bench or as in the present instance it may be built into the table 12 as a permanent part thereof. The operation of the machine 10 may be regulated by means of a plurality of suitable controls mounted in a control panel 14 supported on some portion of the table 12 such as a drawer.

Although the machine may be adapted for loading any kind of workpiece onto any suitable type of workpiece holder, in the present instance, the machine 10 is particularly adapted for loading empty glass capsules 16 such as are used in the manufacture of glass encapsuled diodes onto a workpiece holder or so called solder boat 18.

Glass capsules 16 of this nature are of a substantially standard design which are readily available in the industry. Normally each capsule 16 includes a small section of glass tubing 20 having a cylindrical passage extending axially of the tubing. One end 22 of this tubing 20 is open so as to permit ready access into the passage in the interior of the tube. The opposite end of the tubing 20 is hermetically sealed with an electrical lead 24 or conductor extending therethrough. The glass is fused around the conductor 24 so that a short portion of the conductor extends a small distance into the interior of the glass tubing 20. The remaining portion of the conductor 24 projects from the outside of the capsule for an extended distance. This outer portion of the conductor 24 will form an electrical lead for interconnecting one side of the diode with any desired electrical component.

The workpiece holder or solder boat 18 may be of any conventional design. However, in any given assembly line, all of the holders or solder boats 18 will normally be of a standard or uniform design. By way of example, the solder boats 18 may be substantially identical to the solder boats disclosed in U.S. Patent No. 3,224,308 issued Dec. 21, 1965, to Sydney Dix and assigned of record to Dix Engineering Co., and in copending application Ser. No. 302,931 filed Aug. 19, 1963, in the name of Sydney Dix and assigned of record to Dix Engineering Co.

Such a solder boat 18 includes a center section or platform 26 with a substantially plane surface 28. A pair of legs 30 are provided at the opposite ends of the platform 26 or center section. The legs 30 will be effective to support the platform 26 above the surface upon which the legs 30 rest whereby a substantial clearance space 32 will be provided therebelow.

The platform 26 in the center of the boat 18 may include a plurality of holes 34 for receiving and holding the glass capsules 16. In the present instance, these holes 34 are formed by boring through the plane surface 28 and partially through the platform 26. The inside diameters of these holes 34 are preferably slightly greater than the outside diameter of the glass tubing 20. This will permit the capsule 16 to fit freely into the openings. However, the amount of clearance space is sufficiently small to prevent the capsules 16 falling into an inclined position. In other words, a capsule seated in one of the holes 34 must be in a vertical position with the open end 22 of the tube 20 directed straight up.

A small hole may be provided that extends from the bottom of the hole 34 completely through the platform 26. This small hole is preferably substantially aligned with the center of the first hole 34 and has an inside diameter that is slightly in excess of the outside diameter of the electrical lead 24. However, its diameter is sufficiently small to prevent the capsule 16 passing therethrough. Thus any capsule seated in the holes will have their leads 24 extending downwardly into the clearance space 32.

Although the holes 34 may be positioned in any desired configuration, it is preferable that they be arranged in a regular pattern with the holes 34 being separated by standard spaces. By way of example, the present solder boats 18 have four parallel rows of holes 34 extending lengthwise of the boat 18 and each of the rows contains twenty-five holes 34. It will thus be seen that the boat 18 will be capable of retaining a total of 100 capsules 16 in a predetermined fixed relationship relative to each other.

Since it is desirable for the glass capsules 16 to remain seated in the holes 34 throughout the entire diode manufacturing process, the solder boat 18 should consist of a material which is capable of withstanding all of the treatments to which the capsules 16 will be subjected. Among other things, the solder boat 18 should be capable of withstanding the elevated temperatures required for soldering the various elements of the diode into position. By way of example, it has been found that the solder boats 18 may be made from a light weight high temperature aluminum alloy.

The loading machine 10 which embodies the present invention is adapted to automatically load the glass capsules 16 into the holes 34 through the platform 26 in the center of the solder boats 18 at a high rate of speed without manual labor. The present loading machine 10 includes a hopper or storage means 36 for receiving in bulk the glass capsules 16 having the conductors 24 fastened therein. In addition the machine 10 includes a conveyor 38 for carrying the capsules 16 from the hopper 36, a loader 40 interconnected with the conveyor 38 for receiving the capsules 16 therefrom and loading them into the openings 34 in the solder boats 18 and a transfer drive 42 for advancing the solder boats 18 past the loader 40 as the capsules 16 are placed on the boats 18.

In the present instance, the hopper or storage means 36 includes a large bowl into which the glass capsules 16 may be dumped. The capsules 16 will normally be handled in bulk and positioned in random patterns within the bowl 44. A slide 46 extends spirally around the periphery of the bowl 44 so as to extend from the base to the top. The entire bowl 44 and slide 46 may be vibrated in a well known manner whereby the capsules 16 will gradually work their way around the spiral slide 46 up to the top of the hopper 36.

A spillway 48 may be formed in the spiral slide 46 adjacent the upper end of the slide 46. This spillway 48 will be effective to cause a large majority of the capsules 16 to fall back into the bowl 44 and allow only a small portion to travel past the end of the slide 46. The rate at which the capsules 16 pass the end of the slide 46 will be approximately equal to or slightly greater than the rate at which the machine 10 is capable of loading the capsules 16 into the boats 18.

The conveyor 38 extends from the end of the spiral slide 46 to loader 40 for transferring the capsules 16 therebetween. The present conveyor includes an upper section or separator 50 and a lower section or chute 52. The upper section or separator 50 is solidly connected to the spiral slide 46 so that it will vibrate therewith. This will be effective to insure the capsules 16 continuing to travel through the separator 50.

The separator 50 includes a floor 54 and a pair of flanges or side rails 56 that extend along the opposite sides of the floor 54. The side rails 56 will be effective to confine the capsule 16 to the floor 54 and insure their continuing to travel along the floor 54 as the separator 50 is vibrated. The initial portions of the floor 54 may be substantially flat whereby the capsules 16 may travel over the surface in an entirely random manner. The remaining portions of the floor 54 include a track 58 that extends longitudinally of the separator 50. The present track 58 includes grooves 60 which preferably corresponds in number to the number of rows of holes in the solder boats. Thus, in the present instance, there will be four of these grooves.

All of the grooves 60 may begin at a common point located adjacent the outer flange or side rail 56. In the region of the common point all of the grooves 60 may be relatively shallow and narrow. However, as the grooves 60 extend longitudinally along the floor 54 they will gradually diverge deeper and wider until they cover substantially the full width of the floor 54 at its outer end.

In the embodiment shown the initial portions of the separators 50 is a spiral continuation of the spiral track with the outer portion substantially straight. Accordingly, the grooves 60 may have a similar spiral pattern. Each of the grooves 60 are separated from each other by a relatively sharp edge. This will prevent the capsules 16 that are traveling across the grooves 60 remaining on a space between the grooves 60. As a result the capsules 16 will eventually fall into one or the other of the grooves 60 with the tubular glass portions 20 disposed axially of the grooves 60 and resting on the opposite sides of the grooves 60. Although the capsules 16 at this point will be aligned parallel to the directions of the grooves 60 they may be traveling with the leads 24 either in front of the capsule 16 or behind the capsule 16. After the capsules 16 have settled within one of the grooves 60, the vibrations within the separator 50 will cause the capsules 16 to continue to advance along the grooves 60.

The manner in which the depth of the grooves 60 and the width of the grooves 60 vary are empirically determined so that as the capsules 16 vibrate across the various grooves 60 and settle therein, they will be separated and divided substantially uniformly between the various grooves 60 in the track 58. As a consequence, substantially identical numbers of capsules 16 will travel past the outer ends of each of the grooves 60.

The lower section of the conveyor 38, i.e. the chute 52 is best seen in FIGURES 2, 5, 6 and 7. It extends downwardly from the end of the separator 50 to the loader 40 for transferring the rows of capsules 16 passing from the end of the separator 50 to the loader 40. The chute 52 may be constructed in any desired manner and may be of desired configuration. However, in the present instance, it comprises a plurality of similar members 62 which are bolted or laminated together. Each of the members or laminations 62 may comprise a flat piece having a pair of parallel faces separated by a thickness that is slightly greater than the outside diameter of the glass tube 20. A portion of the mating face may be relieved by milling. This will form a thin clearance space 64 between the abutting faces. The clearance spaces 64 extend substantially the entire length of the chute 52 and are preferably just large enough to permit the conductor or lead wires 24 extending from the ends of the capsule 16 to travel therethrough.

The upper edge of one or both of the mating faces of the laminations may also be relieved or cut away. As a result when the laminating members 62 are placed together, a plurality of grooves 66 will extend along the top of the chute 52. The bottom of each of the grooves 66 will communicate with the relieved clearance space 64.

At the upper end of the chute 64 or the end disposed adjacent the outlet end of the separator 50, as best seen in FIGURE 7 the grooves 66 may be V shaped similar to the grooves 60 in the separator 50. As a consequence, the grooves will be separated by a sharp edge effective to prevent the capsules 16 being disposed between the grooves 66. The chute 52 may be supported by a bracket 68 so as to be separated from the separator 50 to permit the separator 50 to vibrate. However, the grooves 60 and 66 are substantially aligned so that the capsules 16 may freely travel from the grooves 60 in the separator 50 into corresponding grooves 66 in the chute 52.

When the capsules 16 enter the grooves 66 adjacent their upper ends, the capsules 16 will be lying on their sides whereby the capsules 16 will be riding on the edges of the grooves 66 susbtantially as seen in FIGURE 7. At this point capsules 16 will be traveling with either the lead 24 horizontally disposed in front of the capsule 16 or behind the capsule 16.

As soon as the capsules 16 start to descend along the chute 52, the conductors 24 will fall into the clearance spaces 64 formed by the relieved slides of the laminations 62. This will cause the capsule 16 to immediately right itself. The capsule will then continue to slide down the groove 66 until it reaches the lower end of the chute 52 or is stopped by a stationary capsule 16 already disposed within the groove 66.

The grooves 66 formed by relieved edges of the laminations 62 may gradually taper from the V shaped section of FIGURE 7 to a rectangular section substantially as shown in FIGURE 6. It will thus be seen that as the capsules 16 reach the lower end of the chute 52, they will be disposed in the "heads up" position, i.e. the conductor 24 will be disposed in the clearance slot 64 and the open end 22 of the glass tube 20 will be pointed upward.

The loader 40 for transferring the capsules 16 from the lower end of the chute 52 and loading them into openings 34 on the solder boat 18 traveling beneath the loader 40 may be secured directly onto the lower end of the chute 52. In the present instance, the loader 40 includes a housing 70 which is disposed in a vertical position at the end of the chute 52 and extends completely thereacross in direct alignment with the grooves 66 in the chute 52.

The housing 70 includes a separate passage 72 for each of the supply grooves 66 in the chute 52. Each of these passages 72 may form an enlarged opening 74 in the side of the housing in substantial alignment with one of the grooves 66. This opening 74 is large enough to permit a capsule 16 to slide from the groove 66 through the opening 74 and drop into the passage 72. Each of the passages 72 may be substantially cylindrical and extend substantially straight down through the bottom of the housing 70.

The inside diameters of the passages 72 are just slightly larger than the outside diameter of the glass capsule 16. As a consequence, when a glass capsule 16 passes from the chute 52 through one of the openings 74 and into a passage 72 the capsule 16 will drop straight down. Preferably the amounts of clearance within the passages 72 are sufficiently small to prevent the capsules cocking or turning. As a result, when the capsules 16 drop from the lower end of the passage 72, they will be in substantially vertical positions with the conductors or lead wires 24 extending straight down from the lower end of the capsules 16.

In order to control the movement of the capsules 16 from the end of the chute 52 and through the loader 40, an escapement 76 is provided. This escapement 76 may be of any desired variety capable of controlling the movement of the capsules 16. In the present instance the escapement 76 includes a header bar 78 which is reciprocally disposed within a passage that extends across the housing 70. This will permit the header bar 78 to move in directions transverse of the chute 52. A pair of header members 80 and 82 are secured to the header bar 78 on the opposite sides of the housing 70.

The header members 80 and 82 are positioned to extend along the opposite sides of the chute 52 with each one including a small pin or stop 84 and 86. The pin 84 on the first header 80 is positioned so that its end extends into a small passage at the lower end of the chute that is large enough to permit the pin 84 to slide freely within the passage. The passage is preferably disposed immediately adjacent the lower ends of the grooves 66 and extends completely across the chutes 52. As a consequence when the header 78 is disposed adjacent the housing 70, as seen in FIGURE 5, the pin 84 will extend completely across the chute 52 and block all of the grooves 66. Thus any capsules 16 sliding down the grooves 66 in the chute 52 will come to rest against the pin 84 or against the last capsule in a row retained in position by the pin 84. This will be effective to prevent the capsules 16 traveling from the end of the chute 52 and into the passages 72 in the loader housing 70.

The pin 86 on the second header 82 may be substantially identical to the first pin 84. The second pin 86 is secured to the second header 82 substantially parallel to the first pin 84. In addition the end of the second pin 86 slidably fits into a second passage which extends across the chute 52. The second passage and pin 86 are disposed substantially parallel to the first passage and pin 84 but slightly thereabove. Normally the spacing between the two pins 84 and 86 will be equal to or slightly less than the outside diameter of the glass tube 20. When the header bar 78 is positioned as seen in FIGURE 5 the header member 82 will be moved away from the loader housing 70 and the pin 86 will be extracted from all of the clearance spaces 64 so that the capsules 16 are free to travel therepast. However, when the header bar 78 is positioned as seen in FIGURE 2, the pin 86 will be driven completely through the chute 52 and will block all of the clearance spaces 64.

The ends of the two pins 84 and 86 are preferably disposed adjacent each other so that both pins will not simultaneously block the clearance spaces 64. As a consequence, when the first pin 84 extends across the chute 52, the second pin 86 will be in a retracted position and the capsules will be free to travel past the second pin 86 and will come to rest against the first pin 84. However, when the header bar 78 is moved to its other extreme position, the second pin 86 will be driven across the chute 52 so as to completely block all of the spaces 64 and retain columns of capsules 16 above the pin 86. At the same time the first pin 84 will be retracted from the clearance spaces 64 to allow the capsules 16 between the two pins 84 and 86 to slide down the chute 52 into the loader 40.

The two pins 84 and 86 are preferably separated from each other by a distance which is substantially equal or slightly less than the outside diameter of the glass capsules 16. As a consequence only one capsule may be positioned in each groove in the position disposed between the two pins 84 and 86. Thus when the second pin 86 is moved to its extended position and the first pin 84 is retracted, only the lowermost capsules 16 in each groove 66 will be released and allowed to slide into the vertical passages 72 in the housing 70 and drop through the vertical passages 72 and onto the boat 18.

In order to insure that the capsules 16 descending through the passages 72 will be properly loaded onto the solder boat 18, it is essential that the transfer drive 42 position the boat 18 so that the openings 34 in one row are precisely aligned with the passages 72 in the loader 40. Thus, as capsules 16 drop from the vertical passages 72, the leads 24 will enter into the openings 34 and pass through the platform 26. The glass portions of the capsules will then come to rest on the platform 26 with the leads hanging downwardly into the clearance space 32. The legs 30 on the opposite ends of the boat 18 are preferably sufficiently long to insure the leads 24 being spaced from the supporting structure. After a group of capsules 16 have been dropped into a row of openings 34 in the solder boat 18, the transfer drive 42 will advance the boat 18 so that the next row of openings 34 is aligned with the vertical passages 72 to allow the next group of capsules 16 to be dropped.

It may thus be seen that although any suitable transfer drive may be employed it is necessary for the drive to position the solder boat 18 under the loader 40 within sufficiently close tolerances to insure the leads 24 dropping through the passages in the boat 18. In the present instance the transfer drive 42 includes a slide plate 90 that is positioned beneath the loader 40 so as to travel therepast. The plate 90 is adapted to fit on top of the table and to move axially in directions parallel to the chute 52. The plate 90 includes a pair of reference pins 92 that are adapted to fit into complementary sockets in the ends of the legs 30 of the solder boat 18. This will be effective to insure that anytime a boat 18 is seated on the plate 90 it will be disposed in a predetermined position.

In order to move the slide plate 90 back and forth, the transfer drive 42 is disposed beneath the table and operatively interconnected with the plate 90. The transfer drive 42 includes a base plate 94 and a pair of end walls 96 and 98 that project upwardly from the base 94. The base plate 94 and end walls 96 and 98 are adapted to be secured to the table immediately beneath the slide plate 90.

A pair of parallel guide rails 100 are secured to the end walls 96 and 98 so as to extend therebetween. A carriage 102 is mounted on the guides 100 so as to be free to slide therealong. In the present instance the carriage 102 includes a center block 104 and a pair of end blocks 106 and 108 that are secured to the opposite ends of the center block 104. The end blocks 106 and 108 are slidably disposed on the guides 100 and position the top of the center block 104 substantially co-planar with the top of the table 12. The top of the center block 104 may thus be secured directly to the underside of the slide plate 90 for carrying the plate 90 as the carriage 102 moves along the guide rails 100.

In order to advance the carriage 102 along the guides 100, a suitable motor 110 may be secured to the base plate. A right angle drive 112 is connected to the drive shaft of the motor 110. The output shaft from the right angle drive 112 is in turn connected with a drive shaft 114. The drive shaft 114 extends through one of the end walls 98 so as to be at least partially supported thereby. The outer end of the drive shaft 114 is also supported by a pair of suitable bearings 116 mounted in a set of pillow blocks 117. The pillow blocks 117 are secured to the base plate 94 so as to be positioned immediately below or in substantial alignment with the loader 40. It will thus be seen that the end of the drive shaft 114 is disposed immediately below the loader 40 and when the motor is running the end of the shaft 114 will be rotating.

In order to interconnect this rotating shaft 114 with the carriage 102 for advancing the carriage 102 and the slide plate 90, a cam follower 117 may be secured to the carriage 102 and a cam 118 may be secured to the shaft 114 so as to engage the follower 117. In the present instance the cam follower 117 includes an elongated strip 120 which is adapted to be secured to the bottom of the block 104 so as to extend axially thereof parallel to the guides 100. A series of hardened pins 122 may be pressed into the strips 120 so as to project downwardly from the bottom of the carriage 102.

Normally the spacing between these pins 122 will be partially effective to determine the amount of movement of the slide plate 90 during each increment of movement. Accordingly, an elongated strip 120 will normally be selected for use with the block 104 which has a spacing between the pins 122 that corresponds to the spacing between the openings 34 in the boat 18.

Although the cam 118 may be of a conventional design and cut or ground as a single piece it has been found advantageous to employ a two piece cam similar to that shown in FIGURES 2 and 3. More particularly the present cam 118 includes two separate parts that may be secured together. One part is particularly adapted to form a lead section 134 while the other part is particularly adapted to form a dwell section 136. Each of these sections 134 and 136 may subtend an arc of any amount that is suited to the particular operation to be performed. In the present instance each of the sections 134 and 136 subtends an arc of 180°.

The first or lead section 134 includes a substantially semi-cylindrical member that has a semi-cylindrical passage therethrough. This passage is adapted to fit onto the exterior of the drive shaft 114. The exterior of the cam 118 includes a cam profile having any required contour. In the present instance the profile is defined by a rib that projects outwardly from the cylindrical exterior of the cam 118.

In order to produce the section 134 of the cam 118, a member such as a round bar stock may be placed on a standard lathe. A passage may then be drilled through the center thereof that will fit the exterior of the shaft 114. The exterior of the bar stock may then be cutaway to leave a continuous spiral rib or screw thread 130 around the bar stock. It will be appreciated that this operation may be performed on any conventional lathe or thread cutting machine. Moreover the operation is a relatively simple and inexpensive operation which may be performed with a very high degree of precision.

After the foregoing machining operation is complete, the bar stock may be cut transversely normal to its axis to provide a series of rings that have a tooth extending spirally therearound. Each of these discs may then be cut on a diametric plane normal to the plane of the disc. This in turn will provide at least one semi-cylindrical member 134 with a spiral tooth 130 around its exterior. In order to form the second or dwell section 136 a bar stock similar to the first bar may be placed in a standard lathe or thread cutting machine. A passage is cut axially of the stock for the drive shaft 114 and a series of teeth cut around the periphery. Each of these teeth 138 will have zero pitch, i.e., will be in planes normal to the axis of the bar stock. Following this machining operation, the bar stock may be cut transversely adjacent each of the teeth 138 to form a series of discs. The discs are then cut diametrically to form two cylindrical pieces 136. The dwell section 136 and the lead section 134 may then be secured to the shaft 114 by means of set screws 135 to form the desired cam structure.

The cross sections of the teeth 130 and 138 on the two sections 134 and 136 are preferably substantially identical to each other so that they will blend smoothly. In addition, the axial dimensions of the teeth 130 and 138 are preferably substantially identical to the space between adjacent guide pins 122. As a consequence, when a tooth 130 or 138 is disposed between the pins 122 there will be no clearance space or lash-up and the carriage 102 will be positively and accurately locked in position.

As the motor 110 rotates the drive shaft 114 and the cam 118 the teeth 130 and 138 will slide between the pins 122. During the 180° of rotation when the lead section 134 rotates past the pins 122 the tooth 130 will force the pins 122 to move axially. This in turn will move the carriage 102 and slide plate 90 and any solder boat 18 positioned thereon. The amount of this advance will be equal to the pitch of the tooth 130 over the 180°. This is made identical to the spacing between the successive rows of openings 34 in the solder boat 18.

When the cam 118 has rotated through the foregoing 180° so that the lead section 134 has passed beyond the pins 122, the tooth 138 on the dwell section 136 will move into the space between the pins 122. The pitch of this tooth is zero. As a result this tooth 138 will be effective to retain the carriage in a fixed position during the next 180° of rotation. At the end of the second 180° of rotation the ending of the dwell tooth 138 will pass from the space between the teeth 122 and the beginning of the lead tooth 130 will enter into the space between the next succeeding pair of pins 122.

It will thus be seen that while the cam 118 is rotating at a uniform velocity the carriage 102 will be intermittently advanced by a distance equal to the pitch of the lead section 134 and intermittently be retained in a fixed position. The pitch of the tooth 130 or the lead section 134 may be made precisely equal to the spacing between the rows of holes 34 in the solder boat 18. Since the teeth 130 and 138 can be accurately cut and since there will be no clearance space or "lash up" between the pins 122 and cam 118, the boat 18 will be very accurately retained in the fixed position. Thus if rows of holes 34 are spaced at intervals equal to the pitch of the cam 118, the solder boat 18 may be very precisely positioned with reference to the loader 40 during the intervals it is retained in a fixed position by the dwell section 136.

In order to insure that the space between the rows is equal to the pitch of the cam 118, the openings 34 must be accurately located. Although there are numerous means for accomplishing this, it has been found that the openings 34 may be conveniently drilled on a conventional drill press having a transfer table for moving the solder boat 18 past the drill press. In order to control the movement of the transfer table as the openings 34 are being drilled, a strip having a series of pins similar to strip 120 and pins 122 may be mounted on the tranfer table and a cam similar to cam 118 provided for indexing the pins as the openings are drilled through the boat 18.

While the cam 118 has rotated into position to retain the boat 18 in a fixer position under the loader 40, the header bar 78 in the escapement 76 may be moved through one complete stroke. During the first half of this stroke the first pin 84 will be withdrawn from its passage and the second pin 86 inserted through its passage. The second pin 86 will be effective to retain the rows of capsules 16 above the the pin 86 fixed in position. However, each of the lowest capsules that were resting against the first pin 84 will be free to slide through the openings 74 in the loader housing 70 and drop through the passages 72 into the openings 34 in the top of the solder boat 18. Since the cam 118 will accurately position the solder boat 18, the capsules 16 will be very precisely dropped into the openings 34. During the second half of the stroke, the first pin 84 will be reinserted and the second pin 86 withdrawn. This will allow the rows of capsules to then slide downwardly and come to rest against the first pin 84 ready to repeat the operation. In order to accurately coordinate the actuation of the escapement 76 and the dropping of the capsules 16 with the cam's 118 positioning of the solder boat 18, one or more timing means may be provided on the drive shaft 114.

In the present instance the timing means includes a cam 140 secured to the drive 114 and a switch 144 having a follower which engages the periphery of the cam 140. The periphery of the cam 140 includes a reduced section and a raised section 142. The reduced section is effective to allow the switch 144 to remain open but the raised section 142 will close the switch 144. The raised section 142 subtends an arc that is shorter than the arc of the dwell section 136 and is positioned so as to engage the switch follower only during a limited portion of the interval when the dwell section 136 is in alignment with the pins 122. It will thus be seen that the switch 144 will only be closed during a fraction of the interval during which the dwell section 136 has locked the carriage 102 in a fixed position.

This switch 144 may be interconnected with suitable electrical means for actuating the escapement 76. In the present instance, this means includes a pneumatic cylinder 146 having a double acting reciprocating piston 148 therein. The piston 148 is attached to a piston rod 150 which in turn is connected to the header bar 78 by a suitable coupling 152.

A solenoid control valve 154 may be provided which has an inlet pipe 156 and a pair of outlet pipes 158 and 160. The inlet pipe 156 is interconnected with a source of compressed air while the outlet pipes 158 and 160 are interconnected with the ends of the cylinder 146 on the opposite sides of the piston 148. The outlet pipes 158 and 160 are effective to feed compressed air into one end of the cylinder 146 and to exhaust air from the opposite end of the cylinder 146.

The solenoid in the valve 154 is electricaly interconnected directly with the switch 144 so as to be energized when the switch 144 is closed by the cam 140. Normally the switch 144 will be in the open position and the solenoid will be de-energized whereby compressed air will be directed into the end of the cylinder 146 for forcing the piston 148 towards the loader 40 substantially as seen in FIGURE 5. This will be effective to position pin 84 so as to prevent the capsules 16 from traveling through the loader 40. However, when the switch 144 closes and the solenoid is energized, compressed air will be directed into the opposite end of the cylinder 146. This will be effective to force the piston 148 axially through the cylinder 146 in a direction away from the loader 70. At the same time the valve 154 will allow air to escape from the opposite end of the cylinder 146. When the piston 148 moves in this direction, the first pin 84 will be extracted so as to allow the bottom capsule in each groove 66 to drop through the loader 40 and into the openings in the solder boat.

In order to insure a rapid and positive dropping of the capsules 16 through the passages 72 and a proper seating of the capsules 16 upon the solder boat 18, it may be desirable to drive the capsules 16 downwardly through the passages 72 and onto the solder boat 18. In order to accomplish this a pneumatic manifold 162 may be provided which extends across the top of the housing 70 so as to communicate with the upper end of each of the vertical passages 72. This manifold 162 may then be interconnected with a second solenoid valve 164 by means of a tube 166. The solenoid valve 164 is interconnected with a source of compressed gas and is retained normally closed so that no gas may flow therethrough. The solenoid in the valve 164 is electrically interconnected with a second switch 168 positioned adjacent the first switch 144. This switch 168 includes a follower 170 which rides on a second cam 172 mounted on the drive shaft 114 adjacent the first cam 140. When an elevated portion 174 of the profile moves past the follower 170 it will close the switch 168 so as to energize the solenoid and open the valve 168. This will allow a blast of compressed gas to pass through the manifold 162 and down each of the passages 72. The profile of the second cam 172 is positioined so that the blast will occur at the same time or shortly after the time that the capsules 16 enter the passages 72. The downwardly directed blast of gas will be effective to positively drive all of the capsules 16 through the passages 72 and onto the boat 18. It should be noted that in order to minimize the possibility of contaminating the capsules 16, the gas employed is preferably a dry pure nitrogen gas.

In order to employ the present machine for loading a plurality of glass capsules 16 onto a series of solder boats 18, a plurality of the capsules 16 may first be dumped into the storage means 38 so as to be loosely distributed across the bottom of the bowl 44. A suitable control in the control panel 14 may be actuated so as to energize a motor in the storage means whereby the spiral slide 46 and separator 50 will be caused to vibrate. This will cause the glass capsules 16 to work their way around the spiral slide 46 and up onto the separator 50.

A large majority of the capsules 16 traveling up the slide 46 will fall between the spillway 48. However, a substantial portion of them will work their way across the floor 54 of the separator 50 at a rate that is equal to or greater than the rate at which the capsules 16 will be loaded onto the boat 18. The capsules will settle into the various grooves 60 in the track 58 extending around the separator 50. Normally, the capsules will be divided substantially equally betwen the various grooves 60 and will then work their way past the end of the separator 50 and slide down the grooves 66 in the chute 52. The capsules 16 will then come to rest against the pin 84 and form columns of capsules in each of the grooves 66.

As soon as an adequate number of capsules have been accumulated in the grooves 66, a solder boat 18 may be placed upon the slide plate 90. The reference pins 92 will fit into sockets in the ends of the legs 30 so as to maintain the solder boat 18 accurately positioned on the slide plate 90. A stable control in the control panel 14 may then be actuated so as to cause the motor to drive the shaft 114. This will rotate the cam 118 whereby the teeth 130 and 138 will slide betwen the pins 122 on the strip 120 and advance the carriage 102.

As the carriage 102 advances, it will move the slide plate 90 and the solder boat 18 positioned thereon past the loader 40. When the tooth 130 is in engagement with a pair of pins 122, the solder boat 18 will be advancing under the loader 40. When the shaft has rotated a sufficient distance to cause the tooth 138 to come into contact with a pair of pins 122, the solder boat 18 will stop. The relative positions of the reference pins 92, the pins 122 and the tooth 138 will be such that a row of openings 34 will be very precisely located in direct alignment with the lower ends of the passages 72. Because of the very simple interconnection of the drive means and the small number of moving parts there will be little or no play or lash-up that will reduce the accuracy of the positioning of the springs 34. Moreover, since there are very few parts and they are all easily machined, the drive means will not only be very inexpensive but will also be very accurate so as to have very narrow tolerances.

The cams 140 and 172 will be effective to actuate the switches 144 and 168 so as to energize the solenoid in the valves 154 and 164. This will cause air to flow into the cylinder 146 and force the piston 148 away from the housing 70. This, in turn, will cause the pin 84 to be extracted and the pin 86 to be inserted across the chute 52. One capsule 16 in each groove 66 will then slide through the opening 74 and drop through the passage 72.

At approximately the same time, the valve 164 will open and allow a charge of compressed gas to flow through the tube 166 and into the manifold 162. This, in turn, will produce a separate blast of compressed gas that flows downwardly through each passage 72 so as to insure that the capsules 16 are positively driven through the passage 72 and seated in one of the openings 34 in the boat 18.

Since the cam 118 is directly connected to the carriage and since the contour of the teeth 130 and 138 on the cam 118 may be very accurately machined, the openings 34 in the boat 18 will be correspondingly accurately positioned in alignment with the passages 72. Thus, each time the capsules 16 are dropped they will be assured of being properly seated in the openings 34.

The carriage 102 may thus be intermittently advanced and stopped as it moves across the guide rails 100 until all of the openings 34 in the solder boat 18 have been filled with capsules 16. As soon as the openings 34 have been filled with capsules 16 and the boat 18 has moved clear of the loader 40, the boat 18 may be conveniently removed from the slide plate 90 and another boat 18 placed thereon. Switches 176 may be mounted on the end walls 96 and 98 so as to be engaged by adjustable stops 178 secured on the end blocks 106 and 108. Thus, at either of the extremes of the stroke, the carriage 106 will always be automatically stopped and/or reversed. After the loaded solder boat 18 has been removed from the slide plate 90 and an empty one placed thereon and the motor 110 may be run in a reverse direction whereby the slide plate 90 will travel beneath the loader 40 in the opposite direction. This, in turn, will cause the solder boat mounted thereon to be loaded with the capsules.

It may thus be seen that a very simple machine 10 has been provided which may be economically produced and operated with a minimum amount of manual labor. However, in spite of its simplicity and ease of operation, the machine 10 will be effective to reliably and accurately load glass capsules onto solder boats at a very high rate of speed.

While only a single embodiment of the present invention has been disclosed and described herein, it will be readily apparent to persons skilled in the art that numerous changes and modifications may be made without departing from the spirit of the present invention. For example, the various control means and parts may be replaced with alternative controls and parts. Also various parts of the overall loading machine such as the transfer drive may be used in other types of equipment. Accordingly, the foregoing disclosure and description thereof are for illustrative purposes only and do not in any way limit the invention which is defined only by the claims which follow.

What is claimed is:

1. A machine for automatically loading a plurality of glass capsules for encapsulating diodes onto a workpiece holder having a plurality of capsule receiving receptacles arranged in a plurality of longitudinal rows and transverse lines, said machine comprising the combination of:
    a loader having separate loading means for each row of receptacles on said workpiece holder,
    transfer means for carrying said workpiece holder past said loader with said rows being aligned with said loading means,
    a drive shaft in said transfer means for being driven at a substantially constant angular speed,
    a cam in said transfer means secured to said drive shaft for rotating at said constant speed,
    a follower in said transfer means positioned to mesh with said cam, said cam having a lead section positioned to mesh with said follower and to intermittently advance said transfer means and said workpiece holder by distances equal to the spaces between said lines and a dwell section positioned to mesh with said follower and to intermittently position said workpiece holder in predetermined reference positions with the receptacles in said lines being positioned in substantial alignment with said loading means, and
    timing means operatively interconnected with said loading means and responsive to the angular position of said drive shaft, said timing means being effective when said dwell section engages said follower to actuate said loading means to cause a separate capsule to be moved through each of said loading means and into the receptacles in the line aligned with said workpiece holder.

2. A machine for automatically loading a plurality of glass capsules for encapsulating diodes onto a workpiece holder having a plurality of openings extending therethrough in a plurality of longitudinal rows and transverse lines, said machine comprising the combination of:
    a loader having separate loading means for each row of receptacles on said workpiece holder, each of said loading means being effective to individually feed said capsule therethrough,
    transfer means for carrying said workpiece holder past said loader with the rows being aligned with said loading means,
    a cam follower on said transfer means,
    a drive shaft for rotating at a substantially constant angular velocity,
    a cam mounted on said drive shaft for rotating therewith at said constant velocity, said cam having a lead section and a dwell section effective to mesh with said follower, said lead section having a pitch substantially equal to the space between said lines and being effective to intermittently advance said workpiece holder by distances equal to said spacing, said dwell sections being effective to intermittently position said workpiece holder in predetermined fixed reference positions with the lines of openings positioned in substantial alignment with said loading means, and cam means on said drive shaft responsive to the angular position of said drive shaft and operatively interconnected with said loading means to actuate said loading means for causing a separate capsule to be moved through each of said loading means and onto said workpiece holder each time said dwell section positions said workpiece holder in one of said reference positions.

3. A machine for automatically loading a plurality of capsules onto a workpiece holder having a plurality of capsule receiving receptacles spaced at uniform increments and arranged in a plurality of parallel longitudinal rows and a plurality of transverse lines, said machine comprising the combination of:

transfer means for carrying said workpiece holder, drive means operatively interconnected with said transfer means and being effective to intermittently advance said workpiece holder by distances equal to said increments and to intermittently position said workpiece holder in a series of predetermined reference positions, a loader positioned over said transfer means, a separate passage extending through said loader for each row of receptacles, said passages being arranged in a line and positioned to register with the receptacles in one of said lines each time said transfer means position said workpiece holder in one of said predetermined reference positions, storage means for receiving said capsules, conveyor means interconnecting said storage means with said loader for supplying a series of said capsules to each of said passages, an escapement in said conveyor to control the movement of said capsules in said conveyor, said escapement being operatively interconnected with said transfer means and effective to allow a single capsule to pass through each of said passages each time that said transfer means positions said workpiece holder in one of said reference psitions, and a source of compressed gas operatively connected with said passages and with said drive means, said source being effective to direct a flow of gas through the passages when said capsules pass therethrough.

4. A machine for automatically performing a series of similar operations on a workpiece, said machine comprising the combination of:

a work station for performing said operation on said workpiece, transfer means for carrying said workpiece past said work station, a cam follower on said transfer means, a drive shaft for rotating at a substantially constant speed, a cam mounted on said drive shaft for rotating therewith at said speed, a lead section effective to mesh with said follower and to intermittently advance said workpiece holder by distances equal to the pitch of said section, a dwell section effective to mesh with said follower and intermittently position said transfer means and the workpiece in predetermined fixed reference positions, and timing means operatively interconnected with said drive shaft and responsive to the angular position of said drive shaft, said timing means being interconnected with said work station to actuate said work station when said dwell section engages said follower.

5. A machine for automatically performing a series of similar operations on a workpiece, said machine comprising the combination of:

a work station for performing said operation on said workpiece, transfer means for carrying said workpiece, means for supporting said transfer means and moving said transfer means in a substantially straight line past said work station, a cam follower on said transfer means having a series of members spaced at substantially uniformly spaced increments, a drive shaft for rotating at a substantially constant speed, a cam mounted on said drive shaft for rotating therewith at said speed, a lead section effective to mesh with the members on said follower, said lead section having a pitch substantially equal to the spacing between said member to intermittently advance said workpiece holder by distances equal to the spacing between said members, a dwell section effective to mesh with the members on said followers and to intermittently position said transfer means and the workpiece in predetermined fixed reference positions, and timing means operatively interconnected with said drive shaft and responsive to the angular position of said drive shaft, said timing means being interconnected with said work station to actuate said work station during the intervals when said dwell section engages said members.

References Cited

UNITED STATES PATENTS

| | | | |
|---|---|---|---|
| 2,959,903 | 11/1960 | Lancaster | 53—249 X |
| 2,962,913 | 12/1960 | Martin | 74—84 X |
| 3,152,428 | 10/1964 | Hill | 53—249 X |

TRAVIS S. McGEHEE, *Primary Examiner.*

R. L. FARRIS, *Assistant Examiner.*